(12) United States Patent
Kato et al.

(10) Patent No.: US 7,735,473 B2
(45) Date of Patent: Jun. 15, 2010

(54) CONNECTION HEAD STRUCTURE OF HIGH PRESSURE FUEL INJECTION TUBE

(75) Inventors: Nobuo Kato, Sunto-gun (JP); Koichi Hayashi, Sunto-gun (JP); Shoichiro Usui, Sunto-gun (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 12/335,663

(22) Filed: Dec. 16, 2008

(65) Prior Publication Data

US 2009/0151701 A1 Jun. 18, 2009

(30) Foreign Application Priority Data

Dec. 17, 2007 (JP) .............................. 2007-325319

(51) Int. Cl.
*F02M 55/02* (2006.01)
(52) U.S. Cl. ...................................... 123/468; 285/386
(58) Field of Classification Search ................ 123/456, 123/468, 469
See application file for complete search history.

(56) References Cited

U.S. PATENT DOCUMENTS

| | | | |
|---|---|---|---|
| 4,134,430 A | 1/1979 | Mukasa et al. | |
| 4,266,577 A | 5/1981 | Usui | |
| 4,665,879 A | 5/1987 | Earl | |
| 4,784,311 A | 11/1988 | Sugao | |
| 4,900,180 A | 2/1990 | Takikawa | |
| 5,109,888 A | 5/1992 | Usui | |
| 5,120,084 A | 6/1992 | Hashimoto | |
| 5,143,410 A | 9/1992 | Takikawa | |
| 5,169,182 A | 12/1992 | Hashimoto | |
| 5,172,939 A * | 12/1992 | Hashimoto | ................... 285/24 |

(Continued)

FOREIGN PATENT DOCUMENTS

DE 225480 7/1985

(Continued)

*Primary Examiner*—Thomas N Moulis
(74) *Attorney, Agent, or Firm*—Gerald E. Hespos; Michael J. Porco

(57) ABSTRACT

A connection head structure of a high pressure fuel injection tube is provided to avoid an interference between an annular flange and an opposing part by sufficiently maintaining an tube axial direction length of the connection head and to obtain a good sealability to prevent leaking during autofrettage processing with a high pressure of not less than 300 MPa. A connection head structure of a high pressure fuel injection tube includes, on a connection end portion of a thick walled fine steel tube, a spherical seat face, an annular flange, and a circular conic face that continuously extends from the seat face, wherein a washer and a fastening nut are assembled, characterized in that when a thick walled fine steel tube has t (wall thickness)/D (outer diameter)<0.3, an tube axial direction distance L1 from a connection head end to the back face of the annular flange is from 0.38 D to 0.7 D, a spherical body radius R of the seat face is from 0.45 D to 0.65 D, and an outer diameter D1 of the annular flange is from 1.2 D to 1.4 D, wherein an inner circumferential face of the connection head includes a two stage tapered face having a cross section outline in a tube axial direction of the steel tube that broadens toward the aperture of the tube.

8 Claims, 4 Drawing Sheets

U.S. PATENT DOCUMENTS

| | | | |
|---|---|---|---|
| 5,402,829 A | 4/1995 | Takikawa et al. | |
| 5,667,255 A * | 9/1997 | Kato | 285/133.4 |
| 5,709,413 A | 1/1998 | Salyers | |
| 5,903,964 A | 5/1999 | Uematsu et al. | |
| 5,957,507 A | 9/1999 | Asada | |
| 5,979,945 A | 11/1999 | Hitachi et al. | |
| 6,050,611 A | 4/2000 | Asada | |
| 6,070,618 A | 6/2000 | Iwabuchi | |
| 6,186,121 B1 | 2/2001 | Uematsu et al. | |
| 6,408,826 B2 | 6/2002 | Asada et al. | |
| 6,415,768 B1 | 7/2002 | Usui | |
| 6,595,558 B2 | 7/2003 | Kusanagi | |
| 6,824,173 B2 * | 11/2004 | Usui | 285/353 |
| 6,840,283 B2 * | 1/2005 | Furugen et al. | 138/109 |
| 6,843,275 B2 * | 1/2005 | Kato | 138/109 |
| 6,981,722 B2 * | 1/2006 | Watanabe | 285/353 |
| 7,213,576 B2 * | 5/2007 | Furugen | 123/468 |
| 7,461,636 B2 * | 12/2008 | Ricco et al. | 123/456 |
| 7,562,648 B1 * | 7/2009 | Wagner et al. | 123/468 |
| 2004/0256014 A1 | 12/2004 | Kato | |

FOREIGN PATENT DOCUMENTS

| | | |
|---|---|---|
| DE | 10143740 | 3/2003 |
| EP | 1162364 | 12/2001 |
| JP | 2003-336560 | 11/2003 |
| JP | 2005-180218 | 7/2005 |
| JP | 2008-133817 | 6/2008 |
| WO | 2007105660 | 9/2007 |

* cited by examiner

CONNECTION HEAD STRUCTURE OF HIGH PRESSURE FUEL INJECTION TUBE

BACKGROUND OF THE INVENTION

1. Field of the Invention

The present invention relates to a connection head structure of a high pressure fuel injection tube including a relatively thin-diameter thick-walled steel tube multifariously arranged as a supply path of fuel and the like for, as an example, a diesel internal combustion engine.

2. Description of the Related Art

Conventionally, as a high pressure fuel injection tube having such a connection head, as illustrated in FIG. 5, it is known to comprise a connection head 112 defined, on a connection end portion of a relatively thin-diameter thick-walled steel tube 111, by a spherical seat face 113, an annular flange 115 provided at an interval from the seat face 113 in a tube axial direction, and an arcuate face 114 that tapers toward a tip and continuously extends from the seat face 113 to the annular flange 115 (refer to FIG. 4 of Japanese Published Unexamined Patent Application No. 2003-336560). Such a connection head 112 is formed by working with buckling using pressure of a punch member from the exterior in a tube axial direction, and accordingly, an expansion occurs toward the exterior of a circumferential wall due to the working with buckling using the pressure and thereby creates a pocket (annular recessed portion) 116 on the head inner circumferential face having an enlarged inner diameter and an increased tensile stress of the inner surface due to stress concentration; and the connection head 112 is submitted for use in such a state; but problems such as cavitation erosion occurs proximal to the pocket portion due to the high pressure fluid when arranged and used; and unfortunately radial cracks in the connection head occur in the radial direction due to fatigue rupture with starting points in the pocket, and cracks occur in the circumferential direction due to fatigue rupture around the pocket.

As a countermeasure for such problems, the applicant first proposed, for example, a high pressure fuel injection tube including a connection head defined on a connection end portion of a relatively thin-diameter thick-walled steel tube by a spherical seat face, an annular flange provided at an interval from the seat face in a tube axial direction, and a circular conical surface that tapers toward a tip and continuously extends from the seat face to the annular flange, characterized by a method for making a shallow annular curved groove recess in a portion of the circular conical surface and thereby making the pocket shallow and smooth when formed on the head interior due to formation of the connection head (refer to FIG. 1 of Japanese Published Unexamined Patent Application No. 2003-336560), a method for covering the pocket created on the head interior when forming the connection head wherein an exterior circumferential face defines a truncated circular conical or truncated arcuate seat face for fitting to the opposing seat portion with a metal cylindrical member fitted into the head interior (Japanese Published Unexamined Patent Application No. 2005-180218), and the like.

Further, the applicant proposed a connection head structure of a high pressure fuel injection tube to obtain substantially similar or better effects than the technology first proposed, by proposing a means of preventing the occurrence of cracks in the recessed portion of the pocket due to creation of the pocket when forming the head, the occurrence of cracks due to cavitation erosion occurring proximal to the pocket due to the flow of high pressure fluid when arranged and used, and the phenomena of a diameter enlargement of the inner diameter and an increase of tensile stress of the inner surface due to stress concentration resulting from creation of the pocket when forming the head (Japanese Patent Application No. 2007-61085).

This connection head structure of the high pressure fuel injection tube is characterized in that when a thick-walled thin-diameter steel tube has t (wall thickness)/D (outer diameter)<0.3, a tube axial direction distance L1 from a connection head end to the back face of the annular flange is from 0.38 D to 0.6 D, a spherical body radius R of the seat face is from 0.45 D to 0.65 D, an outer diameter D1 of the annular flange is from 1.2 D to 1.4 D, and the head inner circumferential face is formed as a substantially flat cylindrical face and/or a conical surface having a cross section outline in a tube axial direction which has a diameter nearly the same as that of the inner circumferential face of the steel tube; and when a thick-walled thin-diameter steel tube has t (wall thickness)/D (outer diameter)$\geq$0.3, a tube axial direction distance L1 from a connection head end to the back face of the annular flange is from 0.38 D to 0.7 D, a spherical body radius R of the seat face is from 0.45 D to 0.65 D, an outer diameter D1 of the annular flange is from 1.2 D to 1.4 D, and an inner circumferential face of the connection head is formed as a substantially flat cylindrical face and/or a conical surface having a cross sectional outline in a tube axial direction which has a diameter nearly the same as that of the inner circumferential face of the steel tube; and further for the connection head, an angle $\theta$ of an apical angle of a circular conical surface (pressurized seat face) that tapers toward a tip and continuously extends from spherical seat face to the annular flange or to a proximity of the annular flange is from 50 to 60 degrees, a maximum diameter D3 of the circular conical surface is from 1.03 D to 1.09 D, and a circular conical surface, a circular conical surface having a protruding or recessed outline, or a cylindrical face extends from the maximum diameter portion of the circular conical surface to the annular flange.

For the connection head structure of the high pressure fuel injection tube according to Japanese Patent Application No. 2007-61085 recited above, the connection head inner circumferential face has a substantially flat face having a cross section outline in a tube axial direction nearly the same as the inner circumferential face of the steel tube, and therefore almost no pocket (annular recessed portion) is created by plastically working the interior of the connection head; and therefore, excellent effects are provided such as eliminating the occurrence of cracks in the recessed portion of the pocket portion when forming the head, concerns of cracks occurring due to cavitation erosion by fluid pressure inside the head, and phenomena of a diameter enlargement of the inner diameter and an increase of tensile stress of the inner surface due to stress concentration resulting from creation of the pocket when forming the head; drastically reducing the possibility of the connection head inner circumferential face serving as a starting point of fatigue rupture, and the like.

However, it was ascertained that for the connection head structure of the high pressure fuel injection tube according to Japanese Patent Application No. 2007-61085 recited above, an axial direction length of the connection head cannot be sufficiently maintained; and unfortunately, there are concerns that the annular flange may interfere with the opposing part; a risk exists of deterioration of the sealability due to axial misalignment of the nozzle (seal plug) and the tubular body in the case where autofrettage processing is performed on the high pressure fuel injection tube; and in particular, for autofrettage processing with a high pressure of not less than 300 MPa, there are concerns that leaking unfortunately may occur.

SUMMARY OF THE INVENTION

The present invention is carried out to solve the conventional problems, and is directed to propose a connection head structure of a high pressure fuel injection tube to avoid an interference between an annular flange and an opposing part by sufficiently maintaining a tube axial direction length of the connection head and to obtain a good sealability to prevent leaking during autofrettage processing with a high pressure of not less than 300 MPa.

A connection head structure of a high pressure fuel injection tube according to the present invention comprises, on a connection end portion of a relatively thin-diameter thick-walled steel tube, a spherical seat face, an annular flange formed at an interval from the seat face in a tube axial direction, and a circular conical surface that has nearly a substantially spherical face which tapers toward a tip and continuously extends from the seat face to the annular flange or to a proximity of the annular flange, wherein a fastening nut is assembled to engage directly or indirectly with a back face of the annular flange, characterized in that when a thick-walled thin-diameter steel tube has t (wall thickness)/D (outer diameter)<0.3, a tube axial direction distance L1 from a connection head end to the back face of the annular flange is from 0.38 D to 0.7 D, a spherical body radius R of the seat face is from 0.45 D to 0.65 D, and an outer diameter D1 of the annular flange is from 1.2 D to 1.4 D, wherein an inner circumferential face of the connection head comprises a two stage tapered face comprising a cross sectional outline in a tube axial direction of the steel tube that broadens toward the aperture of the tube.

Also, a connection head structure of a high pressure fuel injection tube comprises, on a connection end portion of a relatively thin-diameter thick-walled steel tube, a spherical seat face, an annular flange formed at an interval from the seat face in a tube axial direction, and a circular conical surface that has nearly a substantially spherical face which tapers toward a tip and continuously extends from the seat face to the annular flange or to a proximity of the annular flange, wherein a fastening nut is assembled to engage directly or indirectly with a back face of the annular flange, characterized in that when a thick-walled thin-diameter steel tube has t (wall thickness)/D (outer diameter)≧0.3, a tube axial direction distance L1 from a connection head end to the back face of the annular flange is from 0.38 D to 0.7 D, a spherical body radius R of the seat face is from 0.45 D to 0.65 D, and an outer diameter D1 of the annular flange is from 1.2 D to 1.4 D, wherein an inner circumferential face of the connection head comprises a two stage tapered face comprising a cross sectional outline in a direction of a tubular axis of the steel tube that broadens toward the aperture of the tube.

The present invention further has a favorable embodiment wherein the two stage tapered face is characterized in that a total taper depth LT from a connection head end is from 0.65 L1 to 1.3 L1, an aperture diameter DT1 of the first stage tapered face from the interior of a connection head inner circumference is from 1.15 Din to 1.7 Din wherein Din represents an inner diameter of the thick walled fine steel tube, an aperture diameter DT2 of the second stage tapered face on a connection head aperture end side and extending from the first stage tapered face is from 1.2 Din to 1.9 Din, and a second stage taper half-angle θ is from 20 to 45 degrees.

It is favorable that the high pressure fuel injection tube of the present invention uses a material having a tensile strength of not less than 600 MPa.

In a connection head structure of a high pressure fuel injection tube according to the present invention, the connection head inner circumferential face includes a two stage tapered face having a cross section outline in a tube axial direction of the steel tube that broadens toward the aperture, and therefore almost no pocket (annular recessed portion) is created by plastically working the interior of the connection head; and therefore, the occurrence of cracks in the recessed portion of the pocket portion when forming the head, concerns of cracks occurring due to cavitation erosion by fluid pressure inside the head, and phenomena of a diameter enlargement of the inner diameter and an increase of tensile stress of the inner surface due to stress concentration resulting from creation of the pocket when forming the head are eliminated; the possibility of the connection head inner circumferential face serving as a starting point of fatigue rupture can be drastically reduced; and even when a thick-walled thin-diameter steel tube has t (wall thickness)/D (outer diameter)<0.3, an interference between the annular flange and the opposing part during connection can be avoided; normal functions of the high pressure fuel injection tube connection portion can be maintained when using an internal combustion engine; and it is possible to achieve a smoothing effect on the flow of the fuel combined with a more precise fuel injection because the pocket almost does not exist.

Also, a connection head inner circumferential face includes a two stage tapered face having a cross section outline in a tube axial direction of the steel tube that broadens toward the aperture, and the volume of the head can be reduced during formation with buckling even for a connection head having a relatively long axial direction length by appropriately setting the tube axial direction taper length and the taper angle; buckling is reduced by actively bringing a mandrel into contact with the head inner face during formation of the head by a method for forming the head using a mandrel, and the pocket is eliminated or reduced as much as possible; the sealability between the nozzle (seal plug) and the tubular body can be improved by ensuring a stable seal face or seal line during autofrettage processing performed on the high pressure fuel injection tube; and the stability and reliability of the seal is ensured even for autofrettage processing with a high pressure of not less than 300 MPa.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1:
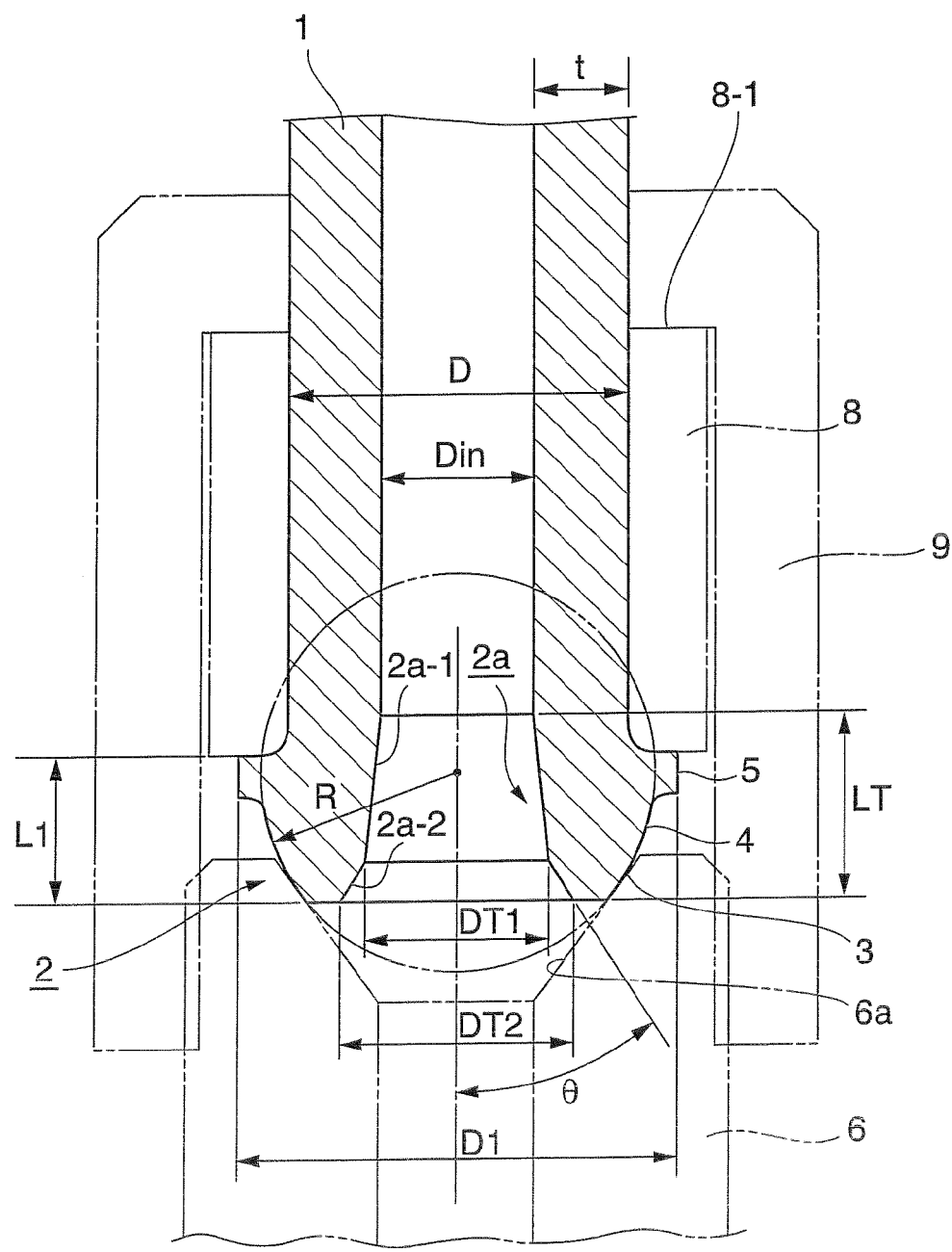
FIG. 1 is a vertical cross-sectional side view illustrating a first example of a connection head structure of a high pressure fuel injection tube according to the present invention.

For a connection head structure of the present invention, and when a thick-walled thin-diameter steel tube has t (wall thickness)/D (outer diameter)<0.3, a tube axial direction distance L1 from the connection head end to the back face of the annular flange is limited from 0.38 D to 0.7 D in order to ensure a tube axial direction length to avoid an interference between the annular flange and the opposing part; and because when the tube axial direction distance L1 is smaller than 0.38 D, the head cannot be formed; and on the other hand, when the tube axial direction distance L1 is larger than 0.7 D, a pocket is created and the pocket gradually becomes larger. Also, the spherical body radius R of the seat face is from 0.45 D to 0.65 D because when the spherical body radius R is smaller than 0.45 D, the head cannot be formed; and on the other hand, when the spherical body radius R is larger than 0.65 D, a pocket is created and the pocket gradually becomes larger. Further, the outer diameter D1 of the annular flange is from 1.2 D to 1.4 D because when the outer diameter D1 is smaller than 1.2 D, a broad pressurized surface area for transmitting a high axial force cannot be ensured when fastened securely to the opposing part; and on the other hand, when the outer diameter D1 is larger than 1.4 D, a pocket is created and the pocket gradually becomes larger.

Also, for a connection head structure of the present invention, and when a thick-walled thin-diameter steel tube has t (wall thickness)/D (outer diameter)≧0.3, a tube axial direction distance L1 from the connection head end to the back face of the annular flange is limited from 0.38 D to 0.7 D because when the tube axial direction distance L1 is smaller than 0.38 D, the head cannot be formed; and on the other hand, when the tube axial direction distance L1 is larger than 0.7 D, a pocket is created and the pocket gradually becomes larger. The reasons for limiting the values of the spherical body radius R of the seat face and the outer diameter D1 of the annular flange are similar to the case when the thick-walled thin-diameter steel tube has the t (wall thickness)/D (outer diameter)<0.3 and therefore are omitted.

Furthermore, for a connection head structure of the present invention, the connection head inner circumferential face is formed as the two stage tapered face having a cross section outline in the tube axial direction of the steel tube that broadens toward the aperture in order to reduce the volume of the head during formation with buckling even for a connection head having a relatively long tube axial direction length; reduce buckling by actively bringing a mandrel into contact with the head inner face during formation of the head by a method for forming the head using a mandrel; eliminate or reduce the pocket as much as possible; and improve the sealability by ensuring a stable seal face (surface contact) or seal line (line contact) during autofrettage processing with a high pressure of not less than 300 MPa.

For the inner circumferential face of the connection head, the total taper depth LT from the connection head end of the two stage tapered face is from 0.65 L1 to 1.3 L1 because when the total taper depth LT is smaller than 0.65 L1, the effect of reducing the volume of the tip during formation with buckling is insufficient; and on the other hand, when the total taper depth LT is larger than 1.3 L1, a wall thickness held between the mandrel and the chuck becomes smaller than the initial wall thickness and becomes difficult to work plastically.

Additionally, the aperture diameter DT1 of the first stage tapered face from the inner part of the connection head inner circumference is from 1.15 Din to 1.7 Din wherein Din is the inner diameter of the thick-walled thin-diameter steel tube because when the aperture diameter DT1 is smaller than 1.15 Din, the effect of reducing the volume of the wall of the connection head is small, there is concern that a pocket may be created or a large pocket may be formed, and it is difficult to ensure a stable seal face (seal line) during autofrettage processing; and on the other hand, when the aperture diameter DT1 is larger than 1.7 Din, the difference of diameters between the aperture diameter DT1 and the second taper at the connection head aperture end side is only slight and the second taper is nearly not formed, and it is difficult to ensure a stable seal face (seal line) during autofrettage processing.

Also, the aperture diameter DT2 of the second stage tapered face at the connection head aperture end side extending from the first stage tapered face is from 1.2 Din to 1.9 Din because when the aperture diameter DT2 is smaller than 1.2 Din, the difference between diameters of the aperture diameter DT2 and the aperture diameter DT1 is only slight and the second taper is nearly not formed, and it is difficult to ensure a stable seal face (seal line) during autofrettage processing; and on the other hand, when the aperture diameter DT2 is larger than 1.9 Din, the wall thickness of the spherical seat face tip portion becomes thin, the strength declines, and there is concern that deformation may occur when fastening securely to the opposing part.

Further, the second stage taper half-angle θ is from 20 to 45 degrees because when the second stage taper half-angle θ is smaller than 20 degrees, the nozzle (seal plug) tends to enter deeply during autofrettage processing, thereby increasing the force in a direction to expand the diameter of the tube end portion and increasing the deformation of the tip despite the relatively high strength material having a tensile strength of not less than 600 MPa, and there is a concern that deformation may occur on the most important spherical seat face; and on the other hand, when the second stage taper half-angle θ is larger than 45 degrees, the tolerance range of the axial misalignment (concentricity) between the nozzle (seal plug) and the injection tube during the autofrettage processing becomes too small, and there is concern that leaking may occur during actual working.

Additionally, for the present invention, the tensile strength of the thick-walled thin-diameter steel tube material is not less than 600 MPa in order to enable a high autofrettage processing pressure, provide a high residual compressive stress, and enable marked autofrettage effects. For the steel type of the thick walled fine steel tube, stainless steel, TRIP steel, carbon steel for high pressure pipes, steel alloy, and the like are favorable. For a thick-walled thin-diameter steel tube material having a tensile strength of less than 600 MPa, the tensile strength of the portion of the connection head may be increased to not less than 600 MPa by a heat treatment after connection head formation.

Figure 2:
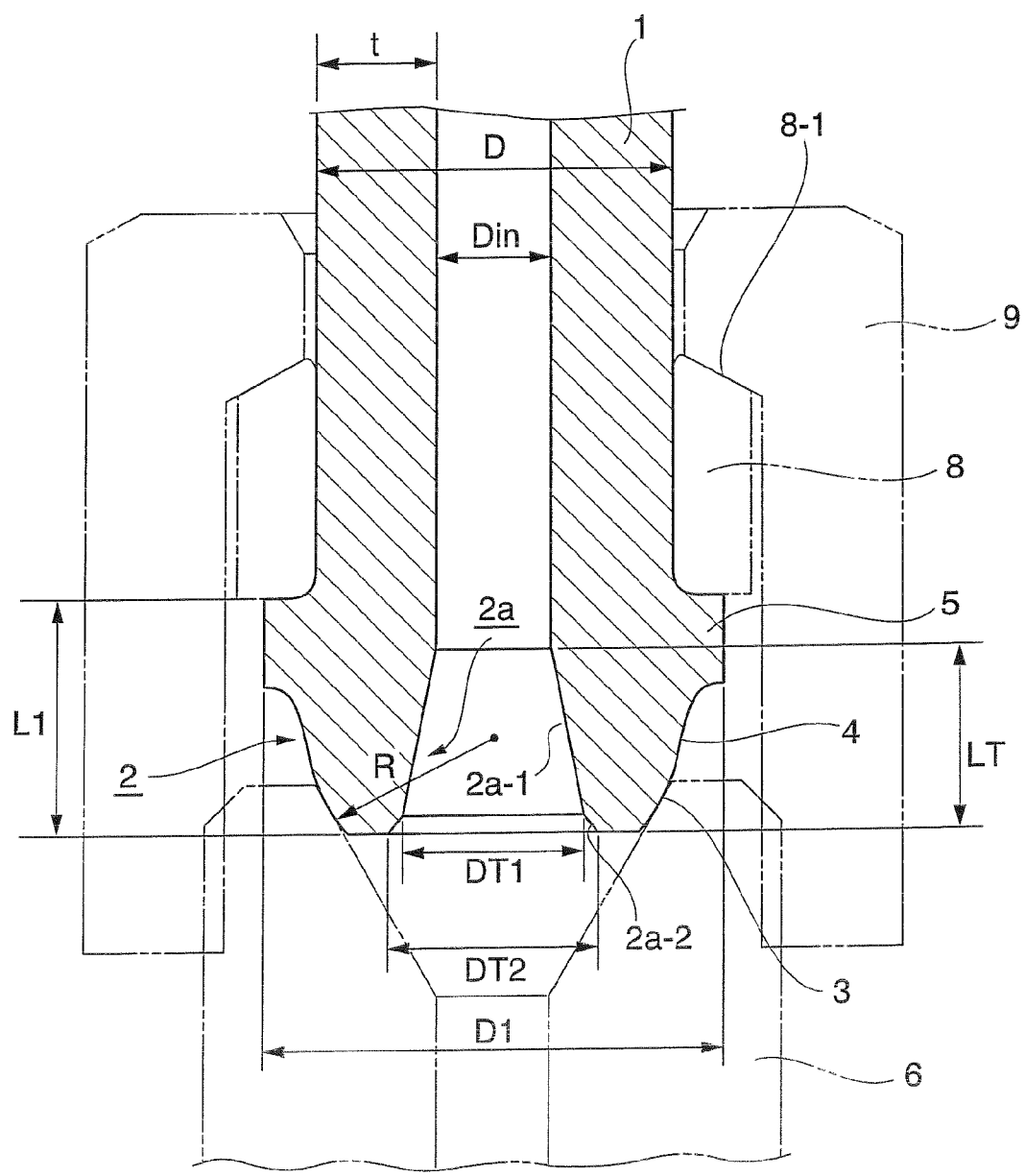
FIG. 2 is a vertical cross-sectional side view illustrating a second example of a connection head structure of the same.
Figure 3:
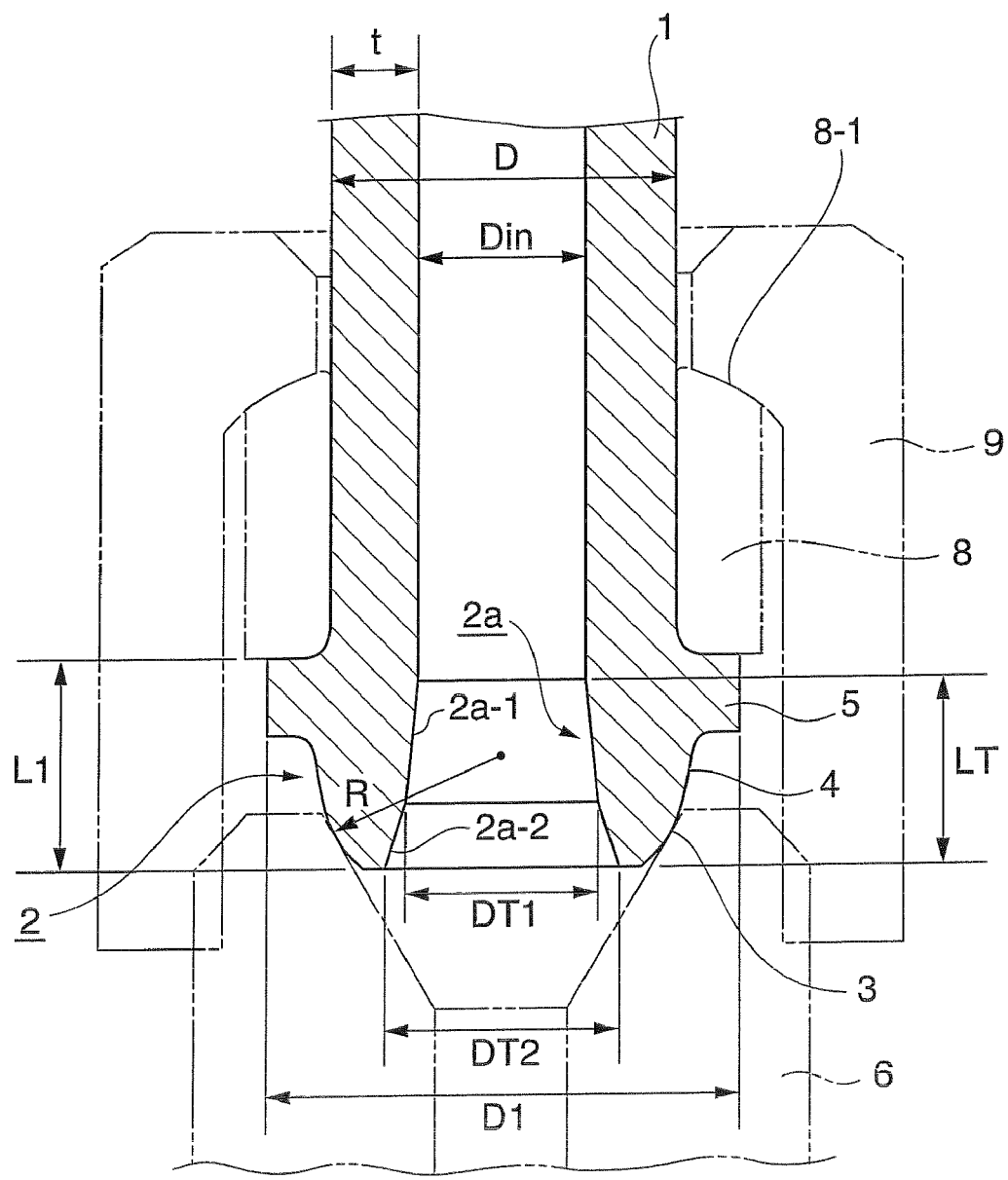
FIG. 3 is a vertical cross-sectional side view illustrating a third example of a connection head structure of the same.
Figure 4:
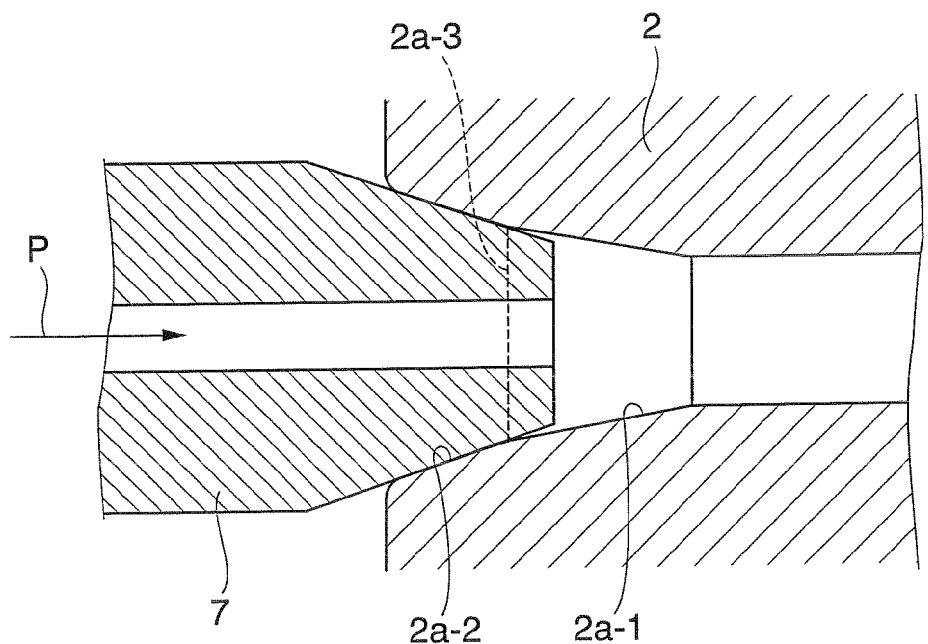
FIG. 4 is an essential component enlarged vertical cross-sectional side view illustrating an example of a fitting state of the connection head structure of the high pressure fuel injection tube according to the present invention with a nozzle (seal plug) during an autofrettage processing.
Figure 5:
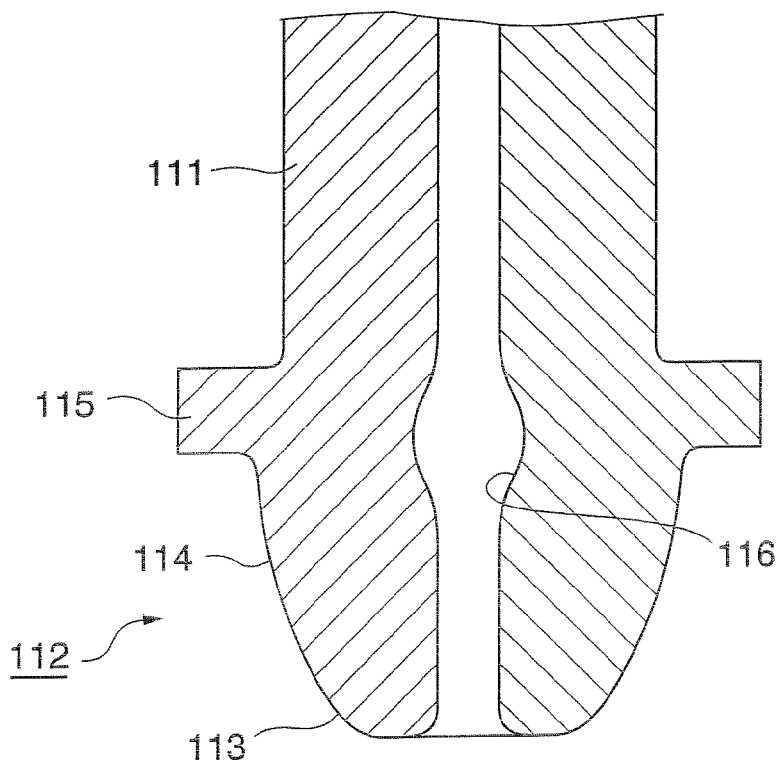
FIG. 5 is a vertical cross-sectional side view illustrating an example of a connection head of a conventional high pressure fuel injection tube related to the present invention.

FIG. 1 is a vertical cross-sectional side view illustrating a first example of a connection head structure of a high pressure fuel injection tube according to the present invention; FIG. 2 is a vertical cross-sectional side view illustrating a second example of a connection head structure of the same; FIG. 3 is a vertical cross-sectional side view illustrating a third example of a connection head structure of the same; FIG. 4 is an essential component enlarged vertical cross-sectional side view illustrating an example of a fitting state of a nozzle (seal plug) during autofrettage processing of a connection head structure of a high pressure fuel injection tube according to the present invention; 1 denotes a thick-walled thin-diameter steel tube; 2 denotes a connection head; 2a denotes a two stage tapered face; 2a-1 denotes a first stage tapered face; 2a-2 denotes a second stage tapered face; 2a-3 denotes an interface line (seal line); 3 denotes a spherical seat face (pressurized seat face); 4 denotes a substantially circular conic face; 5 denotes an annular flange; 6 denotes an opposing part; 6a denotes a seat face (pressure supporting seat face); 7 denotes a nozzle (seal plug); 8 denotes a washer (sleeve washer); 9 denotes a fastening nut; and θ denotes a taper half-angle.

The thick-walled thin-diameter steel tube 1 is a relatively thin-diameter thick-walled tube pre-cut to a dimension and made of a steel material such as stainless steel, TRIP steel, carbon steel for high pressure pipes, or steel alloy having a tensile strength of not less than 600 MPa, wherein the tube diameter D is about from 6 mm to 10 mm, and the wall thickness t is about from 1.25 mm to 3.5 mm.

The connection head structure of the high pressure fuel injection tube of the first example illustrated in FIG. 1 includes, on the connection end portion of the thick-walled thin-diameter steel tube 1, an exterior circumferential face defined by: a spherical seat face 3 for fitting to the opposing seat portion; an annular flange 5 provided at an interval from the seat face 3 in a tube axial direction; and a circular conical surface 4 that has a cross section outline in the tube axial direction which is curved or straight, tapers toward a tip, and continuously extends from the seat face 3 to the annular flange 5; and a head aperture wherein an inner circumferential face of the connection head is formed as a two stage tapered face 2a having a cross section outline in the direction of the tubular axis of the steel tube that broadens toward the aperture; and the connection head structure of the high pressure fuel injection tube includes a connection head 2 in which almost no pocket exists on the inner circumferential face.

For the connection head 2 recited above, a tube axial direction distance L1 from the connection head end to the back face of the annular flange 5 is from 0.38 D to 0.7 D when t/D is either less than 0.3 or more than 0.3, wherein t represents the wall thickness and D represents the outer diameter of the thick walled fine steel tube 1; the spherical body radius R of the seat face 3 is from 0.45 D to 0.65 D; and the outer diameter D1 of the annular flange 5 is from 1.2 D to 1.4 D.

Also, for the two stage tapered face 2a that includes the first stage tapered face 2a-1 from the inner part of the inner circumference of the connection head 2 and the second stage tapered face 2a-2 on the connection head aperture end side extending from the first stage tapered face, the total taper depth LT from the connection head end is from 0.65 L1 to 1.3 L1; the aperture diameter DT1 of the first stage tapered face is from 1.15 Din to 1.7 Din wherein Din represents the inner diameter of the thick walled fine steel tube; the aperture diameter DT2 of the second stage tapered face is from 1.2 Din to 1.9 Din; and the second stage taper half-angle θ is from 20 to 45 degrees.

A washer 8 is fit closely or fit loosely to the lower neck portion of the annular flange 5 by a method such as calking. A contact face 8-1 of the washer 8 for contacting a fastening nut 9 is a planar face, a circular conic face, or a spherical face. Further, the contact face of the washer 8 of the annular flange 5 may be a flat face perpendicular to the tubular axis or a circular conical surface having a diminishing diameter rearward along the tubular axis.

A second example illustrated in FIG. 2 exemplifies the connection head 2 of a high pressure fuel injection tube having a relatively thick tube wall thickness and a relatively large spherical body of the tip seat face in comparison to those of the first example illustrated in FIG. 1; and the connection head 2, similar to that illustrated in FIG. 1, includes an exterior circumferential face defined by: a spherical seat face 3 for fitting to the opposing seat portion; an annular flange 5 provided at an interval from the seat face 3 in a tube axial direction; and a substantially circular conical surface 4 that has a cross section outline in the tube axial direction which is curved or straight, tapers toward a tip, and continuously extends from the seat face 3 to the annular flange 5; and a head aperture wherein the head inner circumferential face is formed as the two stage tapered face 2a having a cross section outline in the tube axial direction of the steel tube that broadens toward the aperture; and wherein almost no pocket exists on the inner circumferential face.

A third example illustrated in FIG. 3 exemplifies the connection head 2 of a high pressure fuel injection tube having a tube diameter and a tube wall thickness of the same size (diameter D of 8 mm and diameter Din of 4 mm) as those of the first example illustrated in FIG. 1; and the connection head 2, similar to those illustrated in FIG. 1 and FIG. 2, includes an exterior circumferential face defined by: a spherical seat face 3 for fitting to the opposing seat portion; an annular flange 5 provided at an interval from the seat face 3 in the tube axial direction; and a substantially circular conical surface 4 that has a cross section outline in the tube axial direction which is curved or straight, tapers toward a tip, and continuously extends from the seat face 3 to the annular flange 5; and a head aperture wherein the head inner circumferential face is formed as the two stage tapered face 2a having a cross section outline in the tube axial direction of the steel tube that broadens toward the aperture; but for this example, the connection head 2 is provided wherein the tube axial direction distance L1 from the connection head end to the back face of the annular flange 5 and the total taper depth LT from the connection head end are nearly the same length and almost no pocket exists on the inner circumferential face.

For the connection head structures of the examples illustrated in FIG. 1 to FIG. 3, the two stage tapered face 2a having a cross section outline in the tube axial direction of the steel tube that broadens toward the aperture is provided on the inner diameter portion of the connection head, and thereby in the case where the tube axial direction distance L1 from the connection head end to the back face of the annular flange 5, that is, the length of the connection head, is not more than 0.7 D; the volume of the space defining the connection head can be reduced; the buckling is reduced by actively bringing a mandrel into contact with the head inner face during formation of the head by a method for forming the head using a mandrel; and the pocket can be eliminated or reduced as much as possible.

Also, in the example of the second stage tapered face 2a-2 on the connection head aperture end side of the two stage tapered face 2a, the formation is performed by a method for forming the head using a mandrel, and thereby a pressurized formation is performed with a high face pressure, and a seal face is obtained having a good precision of shape and a smooth face; and therefore the shape is stable, and the sealability during the autofrettage processing described below is good.

Further, as illustrated in an example of a fitting state of a nozzle (seal plug) during autofrettage processing in FIG. 4 for the connection head structure of the high pressure fuel injection tube according to the present invention, a nozzle (seal plug) 7 is fitted into a portion of the second stage tapered face 2a-2 on the connection head aperture end side of the two stage tapered face 2a, and therefore the nozzle (seal plug) 7 and the tubular body 1 are precisely pressure fitted together without axial misalignment, and the second stage tapered face 2a-2 has a seal face having a good precision of shape and a smooth face as recited above, and therefore a good sealability is obtained even when applying a high pressure in the arrow P direction; and in particular, even for autofrettage processing with a high pressure of not less than 300 MPa, the stability and reliability of the seal is ensured. In FIG. 4, the portion of the second stage tapered face 2a-2 is a seal face (surface contact) of the nozzle (seal plug) 7, but it goes without saying that the nozzle (seal plug) 7 may be fitted into a portion of an annular interface line 2a-3 between the first stage tapered face 2a-1 and the second stage tapered face 2a-2 wherein the portion of the interface line 2a-3 acts as a seal line (line contact). Furthermore, it is of course possible to seal by forming a line contact at an aperture end of the connection head 2 (an aperture end of the second stage tapered face 2a-2).

The connection head illustrated in FIG. 1 was formed using a thick-walled thin-diameter steel tube (material quality: DIN ST52 equivalent with a tensile strength of 800 MPa) having a tube diameter D of 8.0 mm, a tube inner diameter Din of 4.0 mm, and a wall thickness t of 2.0 mm (t/D=0.25) by a method for forming the head using a mandrel. For the tube diameter D and the wall thickness t of each thick-walled thin-diameter steel tube of this example, and for the obtained connection head, the tube axial direction distance L1 from the connection head end to the back face of the annular flange, the spherical body radius R of the seat face, the outer diameter D1 of the annular flange, the total taper depth LT from the connection head end, the aperture diameter DT1 of the first stage tapered face, the aperture diameter DT2 of the second stage tapered face, and the taper half-angle θ are respectively L1=5.0 mm, R=4.325 mm, D1=11 mm, LT=3.0 mm, DT1=4.7 mm, DT2=5.2 mm, and θ=22 degrees, but no creation of a pocket (annular recessed portion) was confirmed on the connection head inner circumferential face. Additionally, as a result of performing autofrettage processing with a high pressure of 500 MPa on the high pressure fuel injection tube including the connection head to confirm the sealability of the obtained connection head, absolutely no leaking of the pressurizing medium from the fitted portion of the nozzle (seal plug) was confirmed.

The connection head illustrated in FIG. 2 was formed using a thick-walled thin-diameter steel tube (material quality: DIN ST52 equivalent with a tensile strength of 640 MPa) having a tube diameter D of 9.0 mm, a tube inner diameter Din of 3.0 mm, and a wall thickness t of 3.0 mm (t/D=0.33) by a method for forming the head using a mandrel. For the tube diameter D and the wall thickness t of each thick-walled fine steel tube of this example, and for the obtained connection head, the tube axial direction distance L1 from the connection head end to the back face of the annular flange, the spherical body radius R of the seat face, the outer diameter D1 of the annular flange, the total taper depth LT from the connection head end, the aperture diameter DT1 of the first stage tapered face, the aperture diameter DT2 of the second stage tapered face, and the taper half-angle θ are respectively L1=4.0 mm, R=4.75 mm, D1=12 mm, LT=6.3 mm, DT1=5.1 mm, DT2=5.7 mm, and θ=35 degrees, but no creation of a pocket (annular recessed portion) was confirmed on the connection head inner circumferential face.

Additionally, as a result of performing autofrettage processing with a high pressure of 700 MPa on the high pressure fuel injection tube including the connection head to confirm the sealability of the obtained connection head, absolutely no leaking of the pressurizing medium from the fitted portion of the nozzle (seal plug) was confirmed for this example as well.

The connection head illustrated in FIG. 3 was formed using a thick-walled thin-diameter steel tube (material quality: DIN ST52 equivalent with a tensile strength of 800 MPa) having a tube diameter D of 8.0 mm, a tube inner diameter Din of 4.0 mm, and a wall thickness t of 2.0 mm (t/D=0.25) by a method for forming the head using a mandrel. For the tube diameter D and the wall thickness t of each thick walled fine steel tube of this example, and for the obtained connection head, the tube axial direction distance L1 from the connection head end to the back face of the annular flange, the spherical body radius R of the seat face, the outer diameter D1 of the annular flange, the total taper depth LT from the connection head end, the aperture diameter DT1 of the first stage tapered face, the aperture diameter DT2 of the second stage tapered face, and the taper half-angle θ are respectively L1=5.0 mm, R=4.325 mm, D1=11 mm, LT=5.1 mm, DT1=4.7 mm, DT2=5.6 mm, and θ=40 degrees, but no creation of a pocket (annular recessed portion) was confirmed on the connection head inner circumferential face.

Additionally, as a result of performing autofrettage processing with a high pressure of 500 MPa to the high pressure fuel injection tube including the connection head to confirm the sealability of the obtained connection head, absolutely no leaking of the pressurizing medium from the fitted portion of the nozzle (seal plug) was confirmed for this example as well.

In a connection head of a high pressure fuel injection tube according to the present invention, an inner circumferential face of the connection head includes a two stage tapered face having a cross section outline in the tube axial direction of the steel tube that broadens toward the aperture, and therefore almost no pocket (annular recessed portion) is created by plastically working the interior of the connection head; and therefore, the occurrence of cracks in the recessed portion of the pocket portion when forming the head, concerns of cracks occurring due to cavitation erosion by fluid pressure inside the head, and phenomena of a diameter enlargement of the inner diameter and an increase of tensile stress of the inner surface due to stress concentration resulting from creation of the pocket when forming the head are eliminated; the possibility of the connection head inner circumferential face serving as a starting point of fatigue rupture can be drastically reduced; and even when a thick-walled thin-diameter steel tube has t (wall thickness)/D (outer diameter)<0.3, an interference between the annular flange and the opposing part during connection can be avoided; normal functions of the high pressure fuel injection tube connection portion can be maintained when using an internal combustion engine; and it is possible to achieve a smoothing effect on the flow of the fuel combined with a more precise fuel injection because the pocket almost does not exist. Also, an inner circumferential face of the connection head includes a two stage tapered face having a cross sectional outline in the tube axial direction of the steel tube that broadens toward the aperture, and the volume of the head can be reduced during formation with buckling even for a connection head having a relatively long tube axial direction length by appropriately setting the tube axial direction taper length and the taper angle; buckling is reduced by actively bringing a mandrel into contact with the head inner face during formation of the head by a method for forming the head using a mandrel, and the pocket is eliminated or reduced as much as possible; the sealability between the nozzle (seal plug) and the tubular body can be improved by ensuring a stable seal face or seal line during autofrettage processing performed on the high pressure fuel injection tube; and the stability and reliability of the seal is ensured even for autofrettage processing with a high pressure of not less than 300 MPa.

Therefore, the present invention is not limited to high pressure fuel injection tubes multifariously arranged as supply paths of fuel for diesel internal combustion engines; applications are possible also for various high pressure metal pipes having connection heads made of relatively thin-diameter thick-walled steel tubes; and the industrial utilization value is exceedingly great.

What is claimed is:

1. A connection head structure of a high pressure fuel injection tube comprising, on a connection end portion of a thick-walled thin-diameter steel tube,
   a spherical seat face,
   an annular flange formed at an interval from the seat face in a tube axial direction, and
   a conical surface having a substantially spherical face which tapers toward a tip and continuously extends from the seat face to the annular flange or to a proximity of the annular flange, and
   a fastening nut is assembled to engage directly or indirectly with a back face of the annular flange,
   wherein when the thick-walled thin-diameter steel tube has wall thickness t/outer diameter D<0.3, a tube axial direction distance L1 from a connection head end to the back face of the annular flange is from 0.38 D to 0.7 D,
   a spherical body radius R of the seat face is from 0.45 D to 0.65 D, and
   an outer diameter D1 of the annular flange is from 1.2 D to 1.4 D,
   wherein an inner circumferential face of the connection head comprises a two-stage tapered face having a cross sectional outline in a tube axial direction of the steel tube that broadens toward an aperture of the tube.

2. A connection head structure of a high pressure fuel injection tube comprising, on a connection end portion of a thick-walled thin-diameter steel tube,
   a spherical seat face,
   an annular flange formed at an interval from the seat face in a tube axial direction, and
   a conical surface having a substantially spherical face which tapers toward a tip and continuously extends from the seat face to the annular flange or to a proximity of the annular flange, and
   a fastening nut is assembled to engage directly or indirectly with a back face of the annular flange,
   wherein when the thick-walled thin-diameter steel tube has wall thickness t/outer diameter D≧0.3 a tube axial direction distance L1 from a connection head end to the back face of the annular flange is from 0.38 D to 0.7 D,
   a spherical body radius R of the seat face is from 0.45 D to 0.65 D, and
   an outer diameter D1 of the annular flange is from 1.2 D to 1.4 D,
   wherein an inner circumferential face of the connection head comprises a two-stage tapered face having a cross sectional outline in a tube axial direction of the steel tube that broadens toward an aperture of the connection head.

3. The connection head structure of the high pressure fuel injection tube according to claim 2, wherein
   the two-stage tapered face is characterized in that a total taper depth LT from the connection head end is from 0.65 L1 to 1.3 L1,
   an aperture diameter DT1 of a first stage tapered face of the inner circumferential face of the connection head is from 1.15 Din to 1.7 Din when D1 represents an inner diameter of the thick-walled thin-diameter steel tube,
   an aperture diameter DT2 of a second stage tapered face on a connection head aperture end side and continuously extending from the first stage tapered face is from 1.2 Din to 1.9 Din, and
   a half-angle of the second stage taper θ is from 20 to 45 degrees.

4. The connection head structure of the high pressure fuel injection tube according to claim 3, wherein the thick-walled thin-diameter steel tube material has a tensile strength of not less than 600 MPa.

5. The connection head structure of the high pressure fuel injection tube according to claim 2, wherein the thick-walled thin-diameter steel tube material has a tensile strength of not less than 600 MPa.

6. The connection head structure of the high pressure fuel injection tube according to claim 1, wherein the thick-walled thin-diameter steel tube material has a tensile strength of not less than 600 MPa.

7. The connection head structure of the high pressure fuel injection tube according to claim 1, wherein
   the two-stage tapered face is characterized in that a total taper depth LT from the connection head end is from 0.65 L1 to 1.3 L1,
   an aperture diameter DT1 of a first stage tapered face of the inner circumferential face of the connection head is from 1.15 Din to 1.7 Din when Din represents an inner diameter of the thick-walled thin-diameter steel tube,
   an aperture diameter DT2 of a second stage tapered face on a connection head aperture end side and continuously extending from the first stage tapered face is from 1.2 Din to 1.9 Dn, and
   a half-angle of the second stage taper θ is from 20 to 45 degrees.

8. The connection head structure of the high pressure fuel injection tube according to claim 7, wherein the thick-walled thin-diameter steel tube material has a tensile strength of not less than 600 MPa.

* * * * *